(12) United States Patent
Hengstler et al.

(10) Patent No.: US 12,487,113 B2
(45) Date of Patent: Dec. 2, 2025

(54) FILL LEVEL MEASUREMENT ARRANGEMENT FOR DETERMINING A LEVEL OR VOLUME OF A FILLING MATERIAL IN A MOBILE CONTAINER

(71) Applicant: VEGA GRIESHABER KG, Wolfach (DE)

(72) Inventors: Clemens Hengstler, Haslach (DE); Matthias Schmidt, Schonach (DE)

(73) Assignee: VEGA GRIESHABER KG, Wolfach (DE)

(*) Notice: Subject to any disclaimer, the term of this patent is extended or adjusted under 35 U.S.C. 154(b) by 439 days.

(21) Appl. No.: 17/321,012

(22) Filed: May 14, 2021

(65) Prior Publication Data

US 2021/0356313 A1 Nov. 18, 2021

(30) Foreign Application Priority Data

May 14, 2020 (DE) .................. 10 2020 206 108.4

(51) Int. Cl.
*G01F 23/2962* (2022.01)
*G01F 23/292* (2006.01)
*G01S 15/88* (2006.01)

(52) U.S. Cl.
CPC ........ *G01F 23/2962* (2013.01); *G01F 23/292* (2013.01); *G01S 15/88* (2013.01)

(58) Field of Classification Search
CPC ..... G01F 23/2962; G01F 23/292; G01S 15/88
See application file for complete search history.

(56) References Cited

U.S. PATENT DOCUMENTS 6,634,234 B1* 10/2003 Haas .................. G01F 23/2962
 73/620
8,161,813 B2 4/2012 Faist
(Continued)

FOREIGN PATENT DOCUMENTS

CN 103348222 A 10/2013
CN 103885467 A 6/2014
(Continued)

OTHER PUBLICATIONS

Non-Final Office Action mailed Mar. 27, 2024, in co-pending U.S. Appl. No. 18/455,716, (17 pages).
(Continued)

*Primary Examiner* — Kristina M Deherrera
*Assistant Examiner* — Jean F Morello
(74) *Attorney, Agent, or Firm* — Oblon, McClelland, Maier & Neustadt, L.L.P.

(57) ABSTRACT

A fill level measurement arrangement for determining a level or volume of a filling material in a mobile container, including a first sensor, for distance measurement, a second sensor, for position measurement, and evaluation circuitry, that determines by analysis of the position measurement or the position measurement whether the mobile container has been moved since a previous measurement of the level, and that applies a first calculation rule in the subsequent calculation of the level or the volume if the mobile container has been moved since a previous measurement, whether the mobile container has been moved since a previous measurement, and in the subsequent calculation of the filling level or the volume from the distance measurement that applies a first calculation rule if the mobile container has been moved since the previous measurement and a second calculation rule if the mobile container has not been moved since the previous measurement.

12 Claims, 2 Drawing Sheets

(56) References Cited

U.S. PATENT DOCUMENTS

| | | | |
|---|---|---|---|
| 9,658,096 B2* | 5/2017 | Kleman | G01F 25/20 |
| 11,340,106 B2* | 5/2022 | Falger | G01S 7/038 |
| 11,861,410 B2 | 1/2024 | Soon-Shiong et al. | |
| 2009/0299662 A1* | 12/2009 | Fehrenbach | G01F 23/28 |
| | | | 73/290 V |
| 2019/0056258 A1* | 2/2019 | Gelada Camps | G01F 23/2928 |
| 2020/0011724 A1* | 1/2020 | Dieterle | G01B 11/22 |

FOREIGN PATENT DOCUMENTS

| | | |
|---|---|---|
| CN | 105004402 A | 10/2015 |
| CN | 105300476 A | 2/2016 |
| CN | 106052797 A | 10/2016 |
| CN | 106323417 A | 1/2017 |
| WO | WO 2019/149512 A1 | 8/2019 |

OTHER PUBLICATIONS

Office Action dated Jul. 19, 2025, issued in counterpart CN Application No. 202110354497.7, citing documents No. 15-21; w/English Translation. (12 pages).

* cited by examiner

FILL LEVEL MEASUREMENT ARRANGEMENT FOR DETERMINING A LEVEL OR VOLUME OF A FILLING MATERIAL IN A MOBILE CONTAINER

CROSS-REFERENCE TO RELATED APPLICATIONS

This application claims priority under 35 U.S.C. § 119 or 365 to German Application No. 10 2020 206 108.4, filed May 14, 2020. The entire contents of the above application is incorporated herein by reference.

FIELD

The application relates to the determination of filling levels or volumes of filling goods in mobile containers. In particular, the application disclosure relates to a level measuring arrangement adapted to determine a level or volume of a product in a mobile container, a use of a level measuring arrangement, a method for determining a level or volume of a product in a mobile container, a program element and a computer-readable medium.

BACKGROUND

Filling level sensors can be used to determine fill levels or volumes of filling material in mobile containers. In addition to sensors that are immersed in the product, contactless sensors are also used. In particular, radar sensors, ultrasonic sensors or optical sensors can be used for this purpose.

To increase the accuracy of the filling volume calculation of a bulk material, the topology of the material surface can be scanned. For this purpose, sensors which allow scanning of the surface of the bulk material to calculate the topology of the surface of the bulk material can be applied.

Scanning the bulk material surface requires high computing and energy resources. However, energy is a scarce resource, especially for autonomous sensors or sensors connected to a 4 to 20 mA two-wire line. Such sensors are also complex in design and expensive.

SUMMARY

It may be desirable to provide a good measurement result in determining a level or volume of a product in a mobile container at low energy requirements and costs.

This desire is met by the features of the independent patent claims. Further embodiments of the disclosure result from the subclaims and the following description of embodiments.

A first aspect of the present disclosure relates to a level measuring arrangement, in particular for process automation in an industrial environment, which is configured to determine a level or a volume of a filling material in a mobile container. The filling material may in particular be a bulk material. The level measuring arrangement comprises a first sensor which is configured for distance measurement. Examples of such a first sensor are radar sensors, ultrasonic sensors or optical sensors that perform time-of-flight measurements. The term "first sensor" is to be interpreted broadly.

Furthermore, the level measuring arrangement comprises a second sensor which is configured to measure an orientation and/or position, i.e. for measuring an orientation or alignment, or for location measurement. Furthermore, an evaluation unit is provided which is configured to determine, by analysis of the orientation or alignment measurement or the location measurement, whether the mobile container has been moved (or not) since a previous measurement of the filling level. Furthermore, the evaluation unit is configured to apply a first calculation rule in the subsequent calculation of the filling level or volume from the distance measurement if the mobile container has been moved since the previous measurement and, if applicable, if a further condition is fulfilled. According to one embodiment, the further condition consists in that the level or distance has not changed by a predetermined first minimum value since the previous measurement.

The evaluation unit is also configured to apply a second calculation rule if the mobile container has not been moved since the previous measurement.

In certain circumstances, these two calculation rules may be identical (see below). In general, however, they will be different.

In a simple case, these calculation rules are implemented in the form of a table from which the corresponding results can be read. This saves computing time and thus energy. The calculation rules may be implemented as part of the software of the level sensor. For example, the first or second calculation rule may be a linearization rule, for example in the form of a linearization table of the filling material, which determines the volume of the filling material as a function of the level of the filling material in the container.

If the container has been moved since the previous measurement, it can be assumed that it has been loaded onto a transporter and thus moved (tilted). If it is then set up vertically again for the following measurement, the bulk material typically forms an inclined plane, the shape of which is included in the first calculation rule.

If the container is then filled in the vertical position, this inclined plane is transformed into a bulk cone. If, on the other hand, the container is emptied (over a longer period of time), a discharge funnel can develop instead of the inclined plane. Accordingly, in each of the last two cases mentioned, a different calculation rule is used for the level or volume calculation. The order of application of the calculation rules can be independent of the result of the measurements and several applications of the calculation rules are possible.

According to an embodiment, the evaluation unit is configured to apply the first calculation rule when calculating the fill level or volume from the distance measurement only if the mobile container has been moved since the previous measurement and the fill level has not changed by a predetermined first minimum value. In this case, an inclined plane is still assumed to be formed by the surface of the bulk material. According to a further embodiment, the evaluation unit is configured to apply the second calculation rule when calculating the fill level or volume from the distance measurement if the mobile container has been moved since the previous measurement, but the fill level has increased or decreased by a first predetermined minimum value since the previous measurement.

In this case, for example, the formation of a dump cone or a discharge funnel can be assumed.

According to a further embodiment of the present disclosure, the evaluation unit is arranged to take into account, when selecting the calculation rule, whether the filling level has increased or decreased since the previous measurement. Depending on how much this increase or decrease of the filling level has turned out, a pouring cone, a discharge funnel or, if the increase has been quite small, still an inclined plane, possibly with a small cone or a small discharge funnel, can be assumed and the appropriate calculation rule corresponding to the circumstances is selected.

At this point, it should be noted again that the level measurement arrangement can use more than two such calculation rules. Simple examples of this are calculation rules which describe an inclined plane, a discharge funnel, a pouring cone or a mixture of inclined plane and pouring cone, inclined plane and discharge funnel, plane level and pouring cone, plane level and discharge funnel or, in the simplest case, a plane, horizontally running product surface.

According to a further embodiment, the first sensor and the second sensor are integrated in a level measuring device.

However, the second sensor can be configured for position measurement and may be not integrated in the level measuring device. Instead of this the second sensor may be integrated, for example, in the mobile container. Alternatively, the location or position determination of the sensor may be carried out by means of mobile radio technology, for example in the sense of radio cell location, which is carried out via the mobile radio network.

In particular, the measurement data of the sensors may be evaluated centrally on a server or in the cloud, and not in the actual level measurement device.

According to another embodiment of the present disclosure, the first sensor is a radar sensor, a sensor using guided microwaves, an ultrasonic sensor, or a laser sensor or other optical sensor.

According to a further embodiment, the filling material is a bulk material.

According to a further embodiment, the second sensor is part of a radio network, for example a private wi-fi or LoRa network, or a public mobile radio network. The first sensor may also be part of such a radio network.

Another aspect of the present disclosure relates to a method for determining a level or volume of a bulk material in a mobile container. A distance measurement is performed, typically by a first sensor. Before, at the same time or afterwards, a orientation or alignment measurement of the container or a position measurement of the container or the first sensor is performed. Thereupon, an analysis of the data of the orientation or alignment measurement and/or the data of the position measurement is performed to determine whether the mobile container has been moved since the previous measurement of the level. At the same time, it may be determined how much the fill level has changed since the previous measurement. In the subsequent calculation of the fill level or volume from the distance measurement, a first calculation rule is applied if the mobile container has been moved since the previous measurement. A second calculation rule is applied in the calculation of the fill level or volume from the distance measurement if the mobile container has been moved since the previous measurement, possibly with the additional condition that the fill level has increased or decreased by a defined value.

In certain cases, the two calculation rules are identical; as a rule, however, they are different.

Another aspect of the present disclosure relates to a program element which, when executed on an evaluation unit of a level measurement arrangement, instructs the evaluation unit to perform the method steps described above and below.

Another aspect of the present disclosure relates to a computer-readable medium on which a program element described above is stored.

The term "process automation in the industrial environment" can be understood as a subfield of technology that includes all measures for the operation of machines and plants without the involvement of humans. One goal of process automation is to automate the interaction of individual components of a plant, for example in the chemical, food, pharmaceutical, petroleum, paper, cement, shipping, or mining industries. For this purpose, a variety of sensors can be used, which are especially adapted to the specific requirements of the process industry, such as mechanical stability, insensitivity to contamination, extreme temperatures, and extreme pressures. Measured values from these sensors are usually transmitted to a control room, where process parameters such as fill level, limit level, flow rate, pressure or density can be monitored and settings for the entire plant can be changed manually or automatically.

A subarea of process automation in the industrial environment concerns logistics automation. With the help of distance and angle sensors, processes within a building or within an individual logistics facility are automated in the area of logistics automation. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and position of an object is required by the respective application. Sensors based on optical measurement methods using lasers, LEDs, 2D cameras or 3D cameras that measure distances according to the time-of-flight (ToF) principle can be used for this purpose.

Another subarea of process automation in the industrial environment concerns factory/production automation. Application cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements in relation to measuring accuracy when detecting the position and size of an object are comparable to those in the previous example of logistics automation.

Further embodiments of the present disclosure are described below. The representations in the figures are schematic and not to scale. If the same reference signs are used in the following description of figures, these describe the same or similar elements.

DETAILED DESCRIPTION OF EMBODIMENTS

Figure 1:
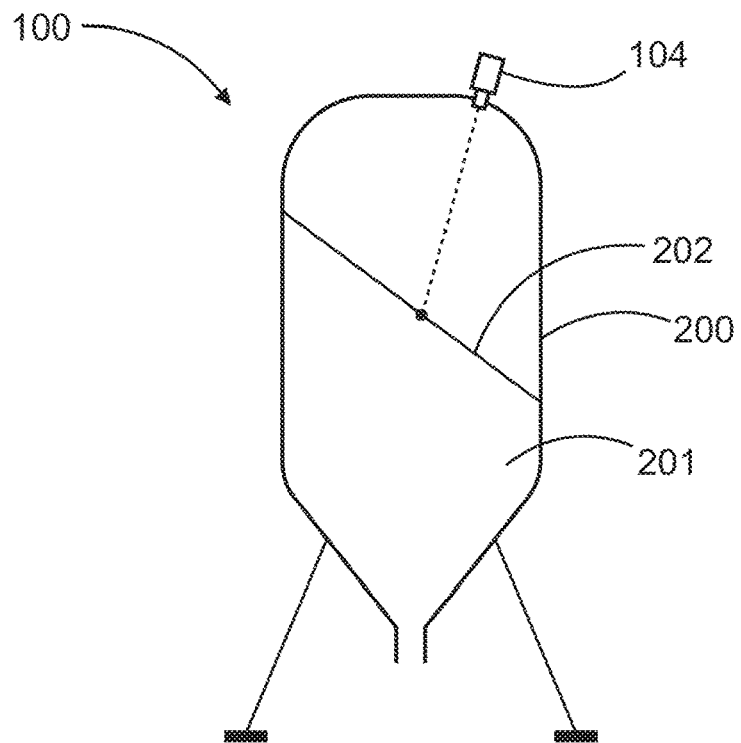
FIG. 1 shows a level measurement arrangement according to a first embodiment.

FIG. 1 shows a level measurement arrangement 100, arranged for determining a level or a volume of a filling material 201 in a mobile container 200. The mobile container 200 comprises an outlet at the bottom, through which the filling material 201 can be discharged.

In the upper area of the mobile container, a level measuring device 104 is mounted which can perform a distance measurement (dashed line). By means of the distance measurement, the distance to the product surface 202 is measured.

As can be seen in FIG. 1, the product surface 202 forms an inclined plane as the container 200 has been tilted and then set up again.

Figure 2:
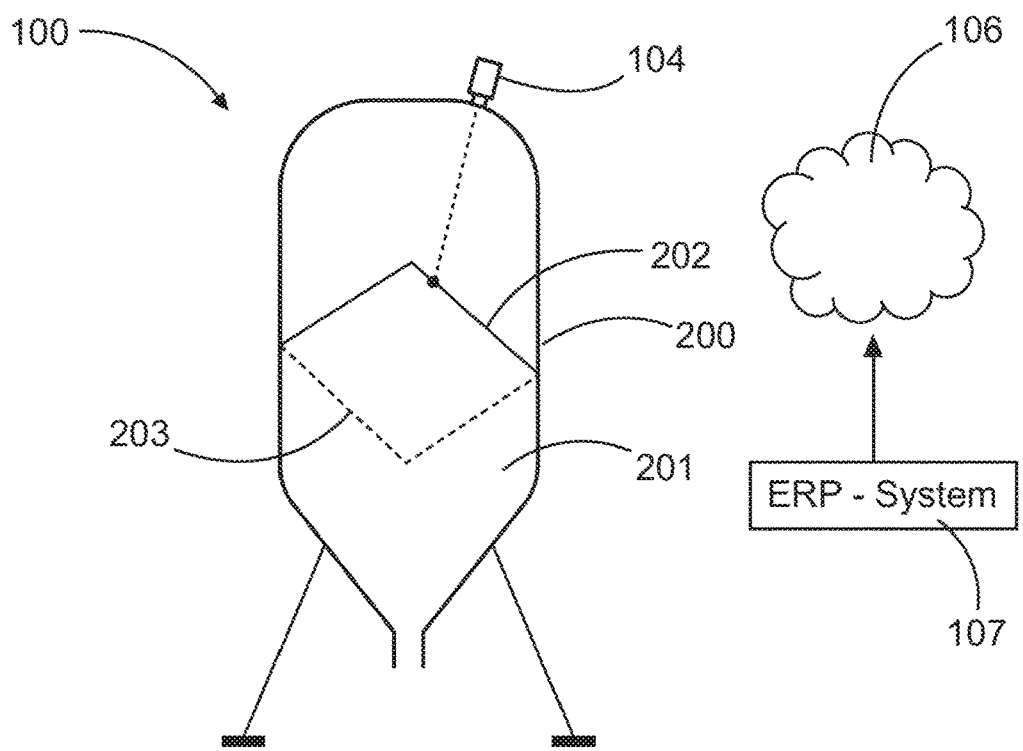
FIG. 2 shows a level measuring arrangement according to a further embodiment.

FIG. 2 shows another embodiment in which a dump cone of the product surface 202 has formed. The dashed line 203 shows the reverse case, in which a discharge funnel has formed. As can be seen from FIG. 2, the initial situation is the inclined plane of FIG. 1, whereby the filling material was then filled further after the mobile container was set up (formation of a pouring cone) or was discharged (formation of a discharge funnel).

Remote from the mobile container, a so-called ERP system 107 (enterprise resource planning system) is provided, which communicates with a cloud-based system 106 to control the filling or emptying operations and to evaluate the measurement data sent by the measurement device 104.

Figure 3:
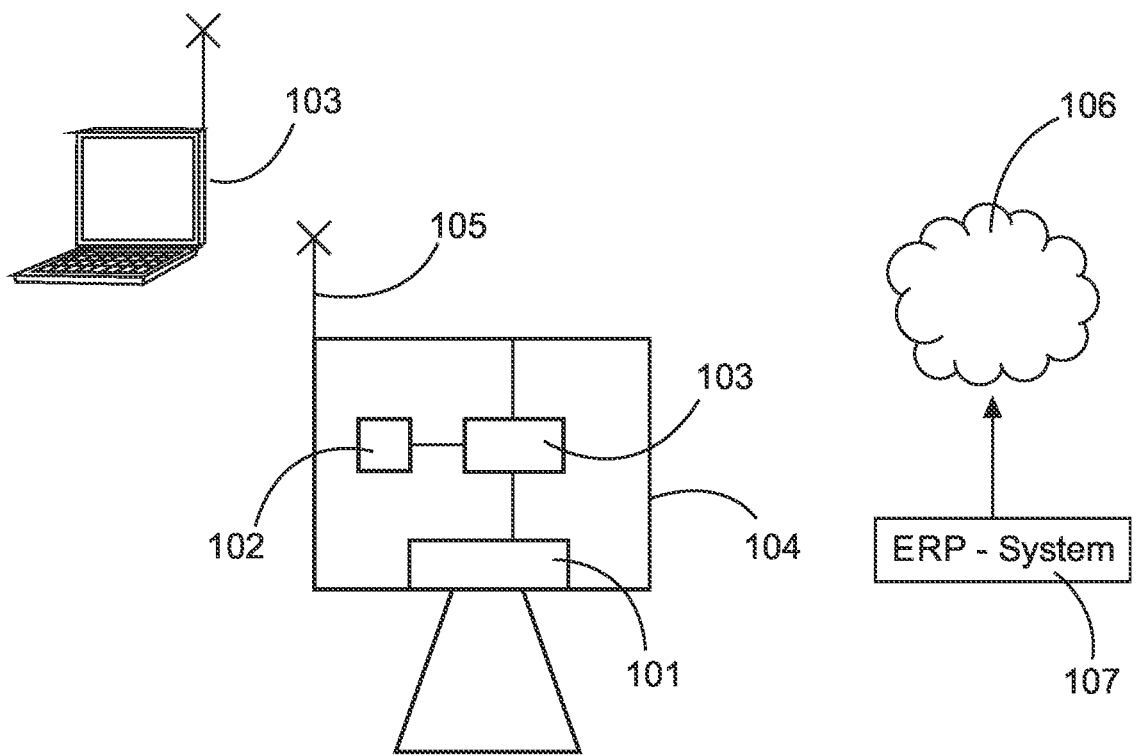
FIG. 3 shows a level measuring arrangement according to a further embodiment.

FIG. 3 shows a further embodiment in which two evaluation units 103 are provided. The first evaluation unit 103 is integrated in the level measuring device 104 and connected to the first sensor 101 and the second sensor 102. The measuring device can send measurement data to a second, external evaluation unit 103 and receive parameterization or control data from the latter via the wireless interface 105. In particular, this external evaluation unit 103 may be integrated in the ERP system 107, or in the cloud-based system 106.

In the application of mobile bulk material silos and layer containers, different bulk cone scenarios arise, which may depend on the respective transport situation of the silo/container. During transport (and during filling at the supplier) the silos/containers are stored horizontally. At the place of use they are then set up vertically. This causes the bulk material to lie in an inclined plane in the container. During use, the silos/bins are refilled on site in an upright position. This then results in a characteristic bulk material cone which is completely different from the condition after the silo/container has been set up vertically.

A single linearization table can be applied, which, however, can lead to considerable deviations from reality in the case of strongly differing pouring cone scenarios.

According to one embodiment of the present disclosure, two or more linearization tables are provided, for example in the form of calculation rules, to thereby achieve a higher accuracy of the measured value. For this purpose, the level measurement arrangement for distance measurement (for example radar, ultrasound, laser, etc.) includes a position sensor which detects when the silo/container has been tilted or positioned for transport. Instead of a position sensor, geodata can also be used. It can be determined whether the silo has been moved, with using GPS or another satellite navigation system, or with using mobile radio. If the location of the silo has changed, it can be assumed that the silo was transported lying down and thus the corresponding linearization table can be selected.

In the embodiment shown in FIG. 1, the mobile container was transported lying down and then turned through 90° and set up vertically at the place of use. This results in a typical inclined plane of the bulk material inside the silo. The position sensor in the distance measurement detects the change in position. This causes the linearization to be carried out with a suitable linearization table (or calculation rule).

After the first emptying, the silo is refilled on site. This can be seen in FIG. 2. Filling the silo from the top results in a typical dumping cone. The position sensor detects that the silo has not been tilted and the distance sensor detects that the fill level in the silo has changed positively (increase). As a result, linearization is now carried out with a second linearization table or calculation rule matching the bulk cone.

There are also cases where the silo is transported with a low fill level and then filled further on site after it has been set up vertically. As soon as the level measuring arrangement detects that the level has risen by a certain percentage or a predetermined minimum value (i.e. a certain distance), the corresponding calculation rule is applied.

The linearization can be performed within the first sensor (distance measurement). As a further option, only the distance value and the position of the sensor can be transmitted via wireless transmission to a cloud-based system, in which the linearization (calculation) is then performed and adjusted (see FIG. 3).

In a case without a position sensor, only when the location information (e.g. geodata) is available, the location information can also be replicated in the cloud, or in the sensor if the sensor records the location data. If the mobile container sends a new location, then the mobile container was transported, and the first calculation rule was used to calculate the fill level (or the volume) from the distance value. If the distance value increases and the silo is at the same location, then the silo was filled on site, so the distance value is converted to the fill level or volume using the second calculation rule.

Based on the additional information regarding the location, an evaluation switch can be provided which always uses the calculation rule adapted to the corresponding circumstances. This ensures that the measured value deviation is minimized due to the adapted linearization.

Through the transfer to a cloud-based system, in addition to the calculation rule adapted to the conditions, the bulk material density or the type of medium can also be quickly and easily adjusted if the bulk material changes within the silo/container. In this way, the trickling behavior of different bulk materials can also be taken into account.

Figure 4:
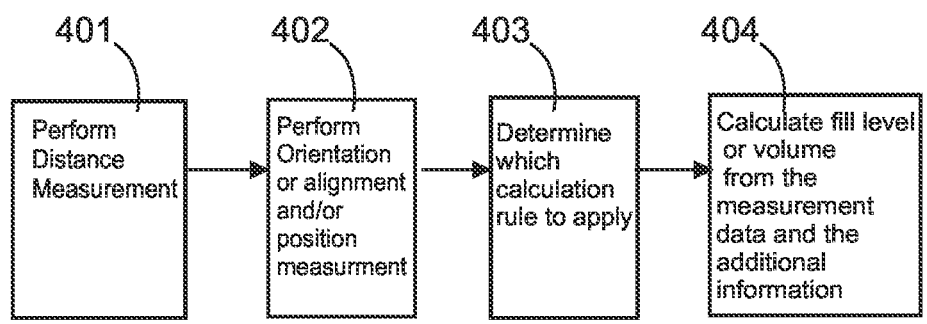
FIG. 4 shows a flow diagram of a method according to one embodiment.

FIG. 4 shows a flow diagram of a method according to one embodiment. In step 401, a distance measurement is performed, and in step 402, an orientation or alignment measurement and/or a position measurement is performed. Prior to the distance measurement 401, such an orientation or alignment and/or position measurement has already been performed and it is now determined in step 403 which calculation rule is to be applied. This depends, among other things, on whether or not the mobile container has been tilted or moved since the previous measurement, which took place before the measurement 401, and whether the level has changed significantly since the previous measurement. In step 404, the actual fill level or volume is then calculated from the measurement data of the distance measurement 401 and the additional information regarding change in position and/or change in location and, if applicable, change in distance since the previous measurement.

Additionally, it should be noted that "comprising" and "comprising" do not exclude other elements or steps, and the indefinite articles "one" or "a" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A fill level measurement arrangement configured to determine a level or volume of a product in a mobile container, comprising:
   a first sensor configured to measure a distance;
   a second sensor configured to measure an orientation of the fill level measurement arrangement or to measure a position of the fill level measurement arrangement; and
   evaluation circuitry configured to
      determine, by analysis of the measured orientation or the measured position, whether the mobile container has been moved since a previous level measurement,
      apply, in a subsequent calculation of the level or volume from the distance measurement, a first calculation rule when the mobile container has been moved or titled since the previous measurement, wherein the first calculation rule is a first linearization table, matching an inclined plane,
      apply a second calculation rule when the mobile container has not been moved or not been tilted since the previous measurement and the filling level or distance has increased by a first predetermined minimum value since the previous measurement, wherein the second calculation rule is a second linearization table matching a bulk cone,
      apply a third calculation rule if the mobile container has not been moved and not been tilted since the previous measurement and the filling level or distance has decreased by a second predetermined minimum value since the previous measurement, wherein the third calculation rule is a third linearization table matching a funnel.

2. The fill level measurement arrangement according to claim 1,
   wherein the evaluation circuitry is further configured to take into account, when selecting the calculation rule, whether the level or the distance has increased or decreased since the previous measurement.

3. The fill level measurement arrangement according to claim 2,
   wherein the first sensor and the second sensor are integrated into a level measuring device.

4. The fill level measurement arrangement according to claim 1,
   wherein the first sensor and the second sensor are integrated into a level measuring device.

5. The fill level measurement arrangement according to claim 4,
   wherein the evaluation circuitry is integrated into the level measuring device.

6. The fill level measurement arrangement according to claim 4,
   wherein the evaluation circuitry is not integrated in the level measuring device.

7. The fill level measurement arrangement according to claim 1,
   wherein the first sensor is one of: a radar sensor, a sensor using a guided radar signal, an ultrasonic sensor, a laser sensor, and a sensor using a time-of-flight measurement method.

8. The fill level measurement arrangement according to claim 1,
   wherein a filling material is a bulk material.

9. The fill level measurement arrangement according to claim 1,
   wherein the second sensor is part of a wireless network.

10. The fill level measurement arrangement according to claim 1,
    wherein the evaluation circuitry is integrated into a level measuring device.

11. A method of determining a level or volume of a product in a mobile container, comprising:
    performing a distance measurement using a first sensor;
    performing an orientation measurement or a position measurement using a second sensor;
    analyzing, using evaluation circuitry, the orientation measurement or the position measurement to determine whether the mobile container has been moved since a previous measurement of a fill level;
    applying, using the evaluation circuitry, a first calculation rule in the subsequent calculation of the level or volume from the distance measurement when the mobile container has been moved or titled since the previous measurement, wherein the first calculation rule is a first linearization table, matching an inclined plane;
    applying, using the evaluation circuitry, a second calculation rule when calculating the fill level or volume from a distance measurement when the mobile container has not been moved or not been tilted since the previous measurement and the filling level or distance has increased by a first predetermined minimum value since the previous measurement, wherein the second calculation rule is a second linearization table matching a bulk cone;
    applying, using the evaluation circuitry, a third calculation rule if the mobile container has not been moved and not been tilted since the previous measurement and the filling level or distance has decreased by a second predetermined minimum value since the previous measurement, wherein the third calculation rule is a third linearization table matching a funnel; and
    verifying, using the evaluation circuitry, the level or volume of the product in the mobile container based on an applied calculation rule.

12. A non-transitory computer readable medium having stored thereon a program element which, when executed by evaluation circuitry of a fill level measurement arrangement device, instructs the evaluation circuitry to be configured to:
    apply a first calculation rule when calculating the level or volume from a distance measurement when a mobile container has been moved or tilted since a previous measurement, wherein the first calculation rule is a first linearization table, matching inclined plane; and
    apply a second calculation rule when calculating the level or volume from a distance measurement when the mobile container has not been moved or not been tilted since the previous measurement and the filling level or distance has increased by a first predetermined minimum value since the previous measurement, wherein the second calculation rule is a second linearization table matching a bulk cone, and
    apply a third calculation rule if the mobile container has not been moved and not been tilted since the previous measurement and the filling level or distance has decreased by a second predetermined minimum value since the previous measurement, wherein the third calculation rule is a third linearization table matching a funnel.

* * * * *